(12) United States Patent
Kuroda et al.

(10) Patent No.: US 8,207,085 B2
(45) Date of Patent: *Jun. 26, 2012

(54) PHOTOCATALYTIC TITANIUM OXIDE SOL, AND COATING COMPOSITION AND MEMBER USING THE SAME

(75) Inventors: Taketoshi Kuroda, Hyogo (JP); Hiroyuki Izutsu, Hyogo (JP); Isamu Yamaguchi, Hyogo (JP); Yoshiyuki Nakanishi, Fukuoka (JP)

(73) Assignees: Taki Chemical Co., Ltd., Hyogo (JP); Toto Ltd., Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/973,531

(22) Filed: Dec. 20, 2010

(65) Prior Publication Data

US 2011/0092359 A1  Apr. 21, 2011

Related U.S. Application Data

(63) Continuation of application No. 11/904,418, filed on Sep. 27, 2007, now Pat. No. 7,879,757.

(30) Foreign Application Priority Data

Sep. 28, 2006  (JP) .................................. 2006-263652

(51) Int. Cl.
| | |
|---|---|
| B01J 23/02 | (2006.01) |
| B01J 23/04 | (2006.01) |
| B01J 23/70 | (2006.01) |
| B01J 23/72 | (2006.01) |
| B01J 23/48 | (2006.01) |
| B01J 23/50 | (2006.01) |
| B01F 3/04 | (2006.01) |
| B01F 3/06 | (2006.01) |
| B01F 3/12 | (2006.01) |
| C09K 3/30 | (2006.01) |
| C01B 13/00 | (2006.01) |
| C01C 1/00 | (2006.01) |
| C01D 1/02 | (2006.01) |
| C01G 3/02 | (2006.01) |
| C01G 5/00 | (2006.01) |
| C01G 7/00 | (2006.01) |
| C01G 23/047 | (2006.01) |

(52) U.S. Cl. ........ 502/344; 502/345; 502/347; 502/350; 502/501; 516/1; 516/8; 516/78; 516/88; 516/90; 516/97; 423/593.1; 423/604; 423/610

(58) Field of Classification Search .................. 502/344, 502/345, 347, 350, 501; 516/1, 8, 78, 88, 516/90, 97; 423/593.1, 604, 610

See application file for complete search history.

(56) References Cited

U.S. PATENT DOCUMENTS

| | | | |
|---|---|---|---|
| 5,755,867 A | 5/1998 | Chikuni et al. | |
| 6,048,910 A | 4/2000 | Furuya et al. | |
| 6,368,668 B1 | 4/2002 | Kobayashi et al. | |
| 7,211,543 B2 | 5/2007 | Nakabayashi et al. | |
| 7,253,226 B1 * | 8/2007 | Ryang ........................ | 524/492 |
| 7,431,903 B2 | 10/2008 | Koyanagi et al. | |
| 7,879,757 B2 * | 2/2011 | Kuroda et al. ............... | 502/344 |
| 2003/0167878 A1 | 9/2003 | Al-Salim | |
| 2008/0081758 A1 | 4/2008 | Kuroda | |

FOREIGN PATENT DOCUMENTS

| | | |
|---|---|---|
| JP | 6-065012 A | 3/1994 |
| JP | 06-080527 A | 3/1994 |
| JP | 11-169726 A | 6/1999 |
| JP | 11-279453 A | 10/1999 |
| JP | 2000-051708 A | 2/2000 |
| JP | 2002-068915 | 3/2002 |
| JP | 2002-068915 A | 3/2002 |
| JP | 2008-080253 A | 4/2008 |
| JP | 2008-260684 A | 10/2008 |
| JP | 2009-263651 A | 11/2009 |

OTHER PUBLICATIONS

H. E. Chao et al., "Effect of Silver Doping on the Phase Transformation and Grain Growth of Sol-Gel Titania Powder", Journal of the European Ceramic Society 23 (2003), pp. 1457-1464.

K. Chiang et al., "Photocatalytic Degradation of Cyanide Using Titanium Dioxide Modified with Copper Oxide", Advances in Environmental Research 6 (2002), pp. 471-485.

Michael K. Seery et al., Journal of Photochemistry and Photobiology A: Chemistry 189 (2007), pp. 258-263.

Written Opinion for PCT/JP2007/068616.

* cited by examiner

*Primary Examiner* — Patricia L Hailey

(74) *Attorney, Agent, or Firm* — Carrier Blackman & Associates, P.C.; Joseph P. Carrier; William D. Blackman

(57) ABSTRACT

A photocatalytic coating composition comprising photocatalytic titanium oxide, silver, copper and a quaternary ammonium hydroxide. The photocatalytic coating composition may include a photocatalytic titanium oxide sol dispersed in a binder. Furthermore, a photocatalytic member includes a substrate having a surface coated with the photocatalytic coating composition. The photocatalyst coating composition can contain highly antibacterial silver by skillfully utilizing copper and a quaternary ammonium hydroxide, and accordingly can show an antibacterial effect not only in a dark place simply due to silver, but also a higher antibacterial effect in a conventional application of employing ultraviolet sterilization by concomitantly using the photocatalyst titanium oxide sol according to the present invention and an ultraviolet sterilizer.

18 Claims, No Drawings

PHOTOCATALYTIC TITANIUM OXIDE SOL, AND COATING COMPOSITION AND MEMBER USING THE SAME

CROSS-REFERENCE TO RELATED APPLICATIONS

This application is a continuation of U.S. application Ser. No. 11/904,418 filed 27 Sep. 2007 (now U.S. Pat. No. 7,879,757 B2), which claims priority from Japanese Patent Application No. 2006-263652, filed 28 Sep. 2006. The entire disclosures of the prior applications are incorporated herein by reference.

BACKGROUND OF THE INVENTION

1. Technical Field

The present invention relates to a photocatalytic titanium oxide sol which presents antibacterial properties in a dark place, and, in particular, relates to a photocatalytic titanium oxide sol which is stable and causes no discoloration by light even though containing silver, and relates to a coating composition and a member using the same.

2. Background Art

It has been known that titanium oxide has a photocatalytic effect that it presents oxidoreductive functions to decompose harmful matters and to show antibacterial properties and a superhydrophilic phenomenon when irradiated with ultraviolet rays, and industrial products using the effect have been actively developed. A photocatalytic reaction occurs in the vicinity of the surface of titanium oxide, so that the industrial products use titanium oxide by making it into a thin film in many cases. Accordingly, a titanium oxide sol made of fine particles of titanium oxide has been widely used as a thin-film-forming material.

The titanium oxide exhibits the photocatalytic effect by the energy of light as its name indicates, and accordingly it exhibits the effect only when irradiated with light such as sunlight and a light of an ultraviolet lamp. As for antifouling properties originating in superhydrophilic properties among the photocatalytic effects, outer stains existing on a film surface having a photocatalytic function can be removed by intermittent irradiation with ultraviolet rays even though the film is not continuously irradiated with the ultraviolet rays. Harmful matters are also decomposed slowly by the intermittent irradiation of light, unless the matters naturally increase. However, the titanium oxide needs to be continuously irradiated with ultraviolet rays in order to keep the antibacterial properties and a deodorizing effect, because bacteria and foul odors multiply and spread while the titanium oxide does not present the photocatalyst effect. When the photocatalyst is incorporated in a product that can be continuously irradiated with light such as an air cleaner and a purifying facility, the product can be always irradiated with light. However, building materials used indoors or outdoors or other amenity-related products do not have their own light source, so that the photocatalyst does not function in a dark place in which there is no sunlight or a lamp. This fact is a big problem for a photocatalytic product which is expected to have the antibacterial properties as well as the effects of decomposing harmful materials and preventing stains due to the photocatalyst, and accordingly, the photocatalyst has been strongly desired to have the antibacterial properties and deodorizing effects in a dark place.

On the other hand, in order to make a product exhibit an antibacterial effect in a dark place having no light therein, the simplest and easiest method is to employ the photocatalyst together with an antibacterial agent other than the photocatalyst. There are various types of compounds in the antibacterial agent, but when the antibacterial agent is used together with the photocatalyst, the antibacterial agent made from an inorganic substance must be used, because the photocatalyst decomposes organic matters. An inorganic antibacterial component includes a metal such as silver, copper and zinc, and many industrial products have been developed, in which the inorganic antibacterial component exist on the surface of a substrate to exhibit the antibacterial properties.

Such an effect of an antibacterial metal can also be utilized in the photocatalyst. Antibacterial properties can be exhibited regardless of the presence or absence of irradiation light, for instance, by making the photocatalyst and the antibacterial metal exist on the same coating film. For instance, a product can present the antibacterial properties in a dark place due to films which have been formed by the steps of forming a photocatalytic film containing titanium oxide on the surface of the product, further applying an aqueous solution of a compound containing an antibacterial metal such as various salts of silver or copper on the surface of the photocatalytic film, and heat-treating or reduction-treating the applied aqueous solution; and thereby possess the photocatalyst effect and the antibacterial properties due to metal ions. However, such a method needs surplus steps of application and drying, and obviously increases the production cost. From an industrial viewpoint, it is preferable to obtain the coating film by applying and drying one chemical solution containing the photocatalyst and antibacterial metal at one time. For that, it is conceivable to blend silver and copper that are the antibacterial metals into a coating-film-forming-material containing the photocatalyst.

As a coating-film-forming material, a titanium oxide sol is preferably used as described above, so that it is conceivable to mix silver and copper in a state of aqueous nitrate solutions respectively with the coating-film-forming material. When an aqueous silver nitrate solution is added to titanium oxide sol STS-01 by a trade name (produced by Ishihara Sangyo Kaisha, Ltd.) stabilized by nitric acid, the resultant solution is apparently stable for a while after silver nitrate has been added. However, after a while, the silver component is reduced, gives the sol a color of yellow to brown, and finally even precipitates. When the sol causes precipitation, the coating film is not stably formed from the sol, shows a defective appearance after the sol has been applied due to the precipitates, or causes the unevenness of antibacterial effects. Then, it is conceivable to add the silver component to the sol right before producing the coating film for the purpose of preventing coloration and precipitation, but it is not rational. For this reason, the present inventors made an extensive investigation on a method of producing a titanium oxide sol which includes an antibacterial metal, has a photocatalytic function and has superior storage stability.

As for a titanium oxide sol containing copper that is one of antibacterial metals, the present inventors have already disclosed the technology. According to the technology, copper is stably dispersed in the titanium oxide sol in a state of a complex dissolved in alkanolamine (See Patent Document 1)

However, as for a titanium oxide sol containing silver and having the photocatalytic function, a stable sol containing silver without causing discoloration and the production method therefor have not been reported. This is because silver is more easily reduced than copper.

On the other hand, an antibacterial agent formed of a colloidal solution of an antibacterial inorganic oxide is disclosed as an antibacterial agent made of an inorganic colloid, which contains inorganic oxide colloidal particles with negative electron charge having one or more antibacterial metal components selected from the group consisting of silver, copper, zinc, tin, lead, bismuth, cadmium, chromium and mercury, thereon. (See Patent Document 2)

Patent Document 2 describes $TiO_2$, but does not direct at imparting a photocatalyst function to an article, and presents an example of a support of an antibacterial agent. Patent Document 2 also describes that when titanium, zirconium and zinc components are used in combination, the components work as ultraviolet absorbers and show an effect of preventing the silver component from discoloration. However, when titanium has a photocatalytic function as in the case of the titanium oxide sol, titanium works completely inversely. Specifically, the titanium oxide sol reduces silver much more rapidly than a sol of amorphous titanium oxide having no photocatalytic function due to the strong oxidoreduction power of the photocatalyst, and causes discoloration therein.

For instance, when a sol is prepared by the steps of employing Tynoc A-6 by trade name (containing 6 mass % $TiO_2$, having pH of 11 and produced by Taki Chemical Co., Ltd.) as an anatase type titanium oxide sol with negative electron charge, and adding silver oxide dissolved in ammonia to the sol, the resultant sol is stable, and is not thickened or gelated. However, when being irradiated with a light of a fluorescent lamp level, the sol causes discoloration in an extremely short period of time, and causes the precipitation of reduced black silver after a while. Such discoloration and precipitation phenomenon greatly decreases not only the function of a product but also the commercial value such as an appearance and convenience in use.

[Patent Document 1] Japanese Patent Laid-Open No. 2002-68915

[Patent Document 2] Japanese Patent Laid-Open No. 6-80527

For this reason, the present inventors made an extensive investigation on a stable photocatalytic titanium oxide sol which does not cause discoloration or precipitation due to the titanium oxide sol of a photocatalyst in spite of containing silver as an antibacterial metal, and as a result, have accomplished the present invention which will be described in detail below.

DISCLOSURE OF THE INVENTION

In order to solve the above described problems, a photocatalytic titanium oxide sol according to the present invention is characterized by including silver, copper and a quaternary ammonium hydroxide.

A photocatalytic titanium oxide sol in a preferred aspect of the present invention is characterized by having a lightness index $\Delta L$ in a value of 10 or less when irradiated with a light having a wavelength range of 300 to 400 nm.

A photocatalytic titanium oxide sol in a preferred aspect of the present invention is characterized in that the content of silver is 0.1 to 5 mass % with respect to titanium oxide in terms of $Ag_2O/TiO_2$, and the ratio of copper is 1 to 30 with respect to silver in terms of $CuO/Ag_2O$ (mass ratio).

A photocatalytic titanium oxide sol in a preferred aspect of the present invention uses tetramethyl ammonium hydroxide as a quaternary ammonium hydroxide.

A photocatalytic titanium oxide sol in a preferred aspect of the present invention is characterized in that the content of a quaternary ammonium hydroxide is 0.01 to 0.1 mol with respect to 1 mol of titanium oxide ($TiO_2$).

A photocatalytic coating composition in a preferred aspect of the present invention has the photocatalytic titanium oxide sol dispersed in a binder.

Furthermore, a member in an aspect of the present invention includes coating the surface of a substrate with the photocatalytic coating composition.

A photocatalyst titanium oxide sol according to the present invention is characterized by causing little discoloration when irradiated with light and causing little gelation and thickening, in spite of containing titanium oxide of a photocatalyst and silver as an antibacterial metal. The photocatalyst titanium oxide sol according to the present invention can contain highly antibacterial silver by skillfully utilizing copper and a quaternary ammonium hydroxide, and accordingly can show an antibacterial effect not only in a dark place simply due to silver, but also a higher antibacterial effect in a conventional application of employing ultraviolet sterilization by concomitantly using the photocatalyst titanium oxide sol according to the present invention and an ultraviolet sterilizer.

BEST MODE FOR CARRYING OUT THE INVENTION

In the next place, a photocatalytic titanium oxide sol according to the present invention will be described in detail.

Titanium oxide in a photocatalytic titanium oxide sol according to the present invention consists of anatase type or rutile type crystals having a photocatalytic effect and a mixture of them. The powder of the sol obtained by drying shall be obviously identified to be an anatase type or a rutile type at least when analyzed by X-ray diffraction. The titanium oxide showing the anatase type or the rutile type has a high photocatalyst function, and accordingly is indispensable as the titanium oxide composing the sol according to the present invention.

A concentration of the photocatalytic titanium oxide sol can be adjusted through an operation such as normal concentration, and preferably is controlled into a range from about 3 to 15 mass % in terms of $TiO_2$. When the concentration is lower than the lower limit, a paint containing the photocatalytic titanium oxide sol forms an extremely thin film after having been applied to a substrate, and tends to present a lower effect of the photocatalytic titanium oxide sol. Accordingly, the paint needs to be applied several times in some cases, which is not productive. On the contrary, when the concentration is higher than an upper limit, the sol shows high viscosity and tends to deteriorate its operability.

In a photocatalytic titanium oxide sol according to the present invention, silver is contained preferably not in an ionized form but in an oxide or hydroxide form. It is recommended that a silver content in the sol according to the present invention is in a range of 0.1 to 5 mass % by a ratio of silver to titanium oxide in terms of $Ag_2O/TiO_2$, and is more preferably in a range of 1 to 3 mass %. When the content is lower than the lower limit, an antibacterial effect of silver cannot be expected. When the content is higher than the upper limit, it is difficult to stably disperse silver oxide or hydroxide in the sol.

In the next place, a quaternary ammonium hydroxide to be used in the present invention will be described in detail. The quaternary ammonium hydroxide is one of indispensable components for stabilizing a photocatalytic titanium oxide sol according to the present invention. All of alkali compounds such as ammonia and primary to tertiary amines are ordinarily known as the components for stabilizing the sol in itself of an alkaline titanium oxide, but on the other hand, these alkali compounds tend to dissolve an antibacterial metal such as silver. In general, discoloration of an antibacterial metal composition is considered to be mainly caused by the ionization of an antibacterial metal, so that such alkali compounds as to dissolve the antibacterial metal should not preferably exist in the sol. Under the circumstances, the present inventors made an extensive investigation, and as a result, have solved the above described problem by using the quaternary ammonium hydroxide as a dispersion-stabilizing agent for the sol. Specifically, the present inventors have found that the quaternary ammonium hydroxide tends to inhibit the discoloration of the antibacterial metal, while stabilizing the titanium oxide sol because the antibacterial metal is not almost dissolved in the quaternary ammonium hydroxide. The quaternary ammonium hydroxide to be used in the present invention includes tetramethyl ammonium hydroxide, tetraethyl ammonium hydroxide, and tetrabutyl ammonium hydroxide. Particularly, tetramethyl ammonium hydroxide is stable in itself and is easily available, so that it is preferable as an agent for stabilizing the sol according to the present invention.

In order to stabilize the sol, a content of the quaternary ammonium hydroxide is preferably in a range of 0.01 to 0.1 mol with respect to 1 mol of titanium oxide ($TiO_2$). The quaternary ammonium hydroxide can stabilize a titanium oxide sol as long as the content is the lower limit or more. On the other hand, it is not preferable to use it in a large amount, because the quaternary ammonium hydroxide dissolves an antibacterial metal even only slightly, though stability of the sol is not greatly decreased even when it is added in an amount exceeding the upper limit.

In the present invention, it is surprising that in addition to the above described quaternary ammonium hydroxide, copper existing in the photocatalytic titanium oxide sol further suppresses the discoloration of silver. A form of copper existing in the sol is not elucidated yet, but copper is preferably added in a form of oxide, hydroxide or the like, because of containing no such nitrate ion and chlorine ion as to destabilize the sol. It is important that a copper content in the sol according to the present invention is in a range of 1 to 30 by a rate (mass ratio) of copper to silver in terms of $CuO/Ag_2O$, and is more preferably in a range of 1 to 10. In other words, at least the same amount of copper as silver needs to be added. When the amount is less than the lower limit, copper shows an extremely low effect of inhibiting discoloration. On the other hand, when a larger amount of copper than the upper limit is added, copper does not show a corresponding effect of inhibiting the discoloration to the added amount.

As described above, a photocatalytic titanium oxide sol according to the present invention includes silver, copper and a quaternary ammonium hydroxide, and can greatly suppress the discoloration of silver. In the present invention, the discoloration is specified to be 10 or less by a value of a lightness index $\Delta L$ when the sol is irradiated with a light having a wavelength range of 300 to 400 nm. Though the value of the lightness index $\Delta L$ will be described later, the $\Delta L$ value over 10 means that the discoloration is great and the commercial value of the sol will be remarkably decreased.

In the next place, a method for preparing a titanium oxide sol according to the present invention will be described in detail.

A titanium salt to be used in the present invention includes, for instance, titanium chloride and titanium sulfate. A sol according to the present invention can employ a gel of titanic acid as a starting material, which is obtained by neutralizing and decomposing the titanium salt with ammonia water. The applicants have already disclosed that a titanium oxide sol having anatase-type microcrystals is obtained by hydrothermally treating the gel at 100° C. or higher. A method for preparing a photocatalytic titanium oxide sol according to the present invention includes, for instance: (1) a method comprising oxides or hydroxides of silver and copper to a gel of titanic acid, hydrothermally treating the mixture, and adding a quaternary ammonium hydroxide to the product; (2) a method comprising adding only a quaternary ammonium hydroxide to a gel of titanic acid, hydrothermally treating the mixture, and adding oxides or hydroxides of silver and copper to the product; (3) a method comprising adding oxides or hydroxides of silver and copper, and a quaternary ammonium hydroxide simultaneously to a gel of titanic acid, and then hydrothermally treating the mixture; and (4) a method comprising hydrothermally treating a gel of titanic acid, and then adding oxides or hydroxides of silver and copper, and a quaternary ammonium hydroxide to the hydrothermally treated gel. The method comprising hydrothermally treating the gel of titanic acid together with the oxides or hydroxides of copper and silver, as in the case of (1) and (3), can suppress the discoloration of silver better than the other methods. In general, as an amount of these additives increases, the titanium oxide tends to be hindered from converting into an anatase type crystal, so that it is desirable to appropriately select a type and an amount of the additives within a range of the present invention before production. When the oxides or hydroxides of silver and copper, and the quaternary ammonium hydroxide are added after hydrothermal treatment as in the case of (4), the sol can be stabilized by further heating the mixture as needed. The mixture has only to be heated at 60 to 100° C. for 1 to 3 hours.

A photocatalytic titanium oxide sol according to the present invention is a sol which is made from titanium oxide, makes its discoloration greatly suppressed, shows an excellent effect when used as a thin-film-forming material for a design-conscious interior material, and can be used in various fields of application to which a photocatalytic effect is expected as well as an antibacterial effect in a dark place.

A photocatalytic member can be manufactured by coating surfaces of various substrates with a photocatalytic titanium oxide sol as it is according to the present invention. The photocatalytic member can also be manufactured by arbitrarily adding a binder to the photocatalytic titanium oxide sol to form a photocatalytic coating composition as needed, and applying the photocatalytic coating composition onto the surfaces of various substrates.

A material for a binder to be added to a photocatalytic titanium oxide sol according to the present invention is not limited in particular, but may be an organic binder or an inorganic binder.

The organic binder includes a polyester resin, a PVA resin, a polyethylene-PVA polymeric resin, a vinyl acetate resin, a urethane resin, an acrylic resin, an acrylic urethane resin, an acrylic styrene resin, an acrylic silicone resin and a vinyl chloride resin.

The inorganic binder includes a zirconium compound, a silicon compound and an aluminum compound. Specifically, the zirconium compound includes: a zirconium salt such as zirconium tetrachloride, zirconium oxychloride, zirconium nitrate, zirconium sulphate, zirconium acetate and zirconium carbonate; and a zirconium alkoxide such as tetraethoxy zirconium, tetra-i-propoxy zirconium, tetra-n-butoxy zirconium and tetra-t-butoxy zirconium. The silicon compound includes: an alkali silicate such as sodium silicate, potassium silicate, lithium silicate, cesium silicate and rubidium silicate; an alkoxysilane such as methyl trimethoxysilane, methyl triethoxysilane, methyl trichlorosilane, methyl tribromosilane, methyl triisopropoxysilane, methyl tri-t-butoxysilane, ethyl trimethoxysilane, ethyl triethoxysilane, ethyl trichlorosilane, ethyl tribromosilane and ethyl triisopropoxysilane; and a silanol which is a hydrolyzed product of an alkoxysilane. The aluminum compound includes: an aluminum salt such as aluminum lactate, aluminum phosphate, aluminum chloride; and an aluminium alkoxide such as triethoxy aluminum, tri-i-propoxy aluminum, tri-n-butoxy aluminum and tri-t-butoxy aluminum.

It is also possible to impart an additional function to a coated film by adding another additive than a binder into a coating composition. The additive allowed to be added into the coating composition includes: a pigment component for coloring the coating composition; a silica component for imparting hydrophilicity to a coating film; and a thickener, an antifoaming agent and a dispersing agent for adequately keeping storage stability and operability of the coating composition.

A substrate to which a photocatalytic coating composition is applied is not limited in particular, but when the substrate is a heat-resistant substrate such as a metal and a ceramic, for instance, a tile, the substrate can be heated and dried after the photocatalytic coating composition has been applied onto the surface, and the photocatalyst-containing film formed on the substrate surface strongly adheres to the substrate. On the other hand, when the substrate is a heat-sensitive material or an existing wall surface, it is preferable to apply the photocatalytic coating composition containing a binder which is curable at room temperature, onto the surface.

EXAMPLES

In the next place, the present invention will be described in more detail with reference to examples, but the present invention is not limited to the examples described below. In the following description, a symbol % means mass % unless otherwise specified.

A method of measuring a value of a lightness index $\Delta L$ according to the present invention and a method of an antibacterial activity test are defined in the following description.

(Method of Measuring Value of Lightness Index $\Delta L$)

A concentration of a silver-containing photocatalytic titanium oxide sol is adjusted so that the content of $Ag_2O$ is 0.05%; and the gel is then dispensed at 30 g into a sampling bottle with a volume of 50 ml made from glass. A value of a lightness index L1 of the sol was measured before irradiation with a black light. The sampling bottle is fixed in a shaker; set so that a container surface can be 1 mW/cm$^2$ (365 nm) when irradiated with a black light of 20 W type; the bottle was irradiated with the light for 30 minutes; and a value of a lightness index L2 of the irradiated sol was measured.

In the above procedure, the value of the lightness index L was measured by using Z-1001DP made by Nippon Denshoku Industries Co., Ltd., and a sample in an amount of 5 g was put into a cell with an irradiation area of 30 mm $\phi$. Then, the difference between L1 and L2 was determined as the value of the lightness index $\Delta L=|L1-L2|$.

(Method of Antibacterial Activity Test)

A test was conducted by a film adhesion method based on "Fine-ceramics: antibacterial testing method and antibacterial effect of photocatalyst-antibacterial processed product under irradiation with light" described in "Technical Regulations Development: Standardization of Photocatalytic Test Procedure" sponsored by Ministry of Economy, Trade and Industry, in 2005 (March, 2006, Japan Fine Ceramics Association). *Escherichia coli* NBRC3972 was used as bacteria in the test. In addition, the following culture media and the like were used in the test:

a) Ordinary bouillon culture medium with 1/500 concentration (hereinafter, referred to as 1/500 NB): put 1,000 ml of pure water into a flask, weigh out 3.0 g of meat extract essence, 10.0 g of peptone and 5.0 g of sodium chloride, put the ingredients into the flask, stir the mixture to sufficiently dissolve the contents, add a sodium hydroxide solution or a hydrochloric acid solution into the solution to adjust the pH into 7.1±0.1 (25° C.), dilute the solution with pure water into 500 times, adjust the pH into 6.7 to 7.2 (25° C.) with a sodium hydroxide solution or a hydrochloric acid solution, dispense the solution into a test tube or a conical flask as needed, plug the tube or the flask with cotton, and sterilize the solution with high-pressure steam;

b) nutrient agar medium: put 1,000 ml of pure water into a flask, weigh out 3.0 g of meat extract essence, 5.0 g of peptone and 15.0 g of agar, put the ingredients into the flask, stir the mixture in boil water bath to sufficiently dissolve the contents, add a 0.1 mol/l sodium hydroxide solution into the solution to adjust the pH into 6.8±0.2 (25° C.), plug the flask with cotton, and sterilize the solution with high-pressure steam;

c) SCDLP culture medium: put 1,000 ml of pure water into a flask, weigh out 17.0 g of peptone caseinate, 3.0 g of soja bean peptone, 5.0 g of sodium chloride, 2.5 g of potassium dihydrogen phosphate, 2.5 g of glucose and 1.0 g of lecithin, put the ingredients into the flask, stir the mixture to sufficiently dissolve the contents, further add 7.0 g of a nonionic surface active agent, dissolve the agent, add a sodium hydroxide solution or a hydrochloric acid solution into the solution to adjust the pH into 7.0±0.2 (25° C.), dispense the solution into a test tube or a conical flask as needed, plug the tube or the flask with cotton, and sterilize the solution with high-pressure steam; and d) physiological saline solution: put 1,000 ml of pure water into a flask, weigh out 8.5 g of sodium chloride, put the sodium chloride into the flask to sufficiently dissolve it, dispense the solution into a test tube or a conical flask as needed, and sterilize the solution with high-pressure steam.

In the next place, a method of irradiating a sample with light in a test will be shown. An irradiation intensity of an ultraviolet ray is measured by the steps of: fixing a light-receiving section of an ultraviolet ray illuminance meter on a floor surface of a light irradiation apparatus; placing a film and a glass plate to be used in the test on the light-receiving section; and reading an indicated value. A position at which a predetermined illuminance of an ultraviolet ray is obtained is determined, and is decided to be a test piece setting position. A test piece inoculated with a test bacteria liquid is irradiated with light by the steps of: putting the test piece inoculated with the test bacteria liquid into a reserving dish; covering the reserving dish with a lid of a moisture retention glass or a reserving dish; and irradiating the test piece with light in a state of having kept the reserving dish at a temperature of 25±5° C.

A test piece inoculated with a test bacteria liquid is reserved in a dark condition by the steps of: putting the test piece inoculated with the test bacteria liquid into a reserving dish; covering the reserving dish with a lid of a moisture retention glass or a reserving dish; and reserving the reserving dish so that the test piece cannot be exposed to light, in a state of having kept the reserving dish at a temperature of 25±5° C.

A test piece to be used is prepared by cutting out a flat part of a tabular sample into a square with a size of 50±2 mm per side (with thickness of 10 mm or less). (Nine test pieces and six test pieces are prepared. The former pieces are not treated with a photocatalyst antibacterial process and the latter pieces are treated with the photocatalyst antibacterial process.) The test piece is cleaned by the steps of: softly wiping the whole surface of the test piece with an official gauze or absorbent cotton absorbing ethanol twice or three times; and then sufficiently drying the surface.

Test bacteria are precultured by the steps of: transplanting one platinum loop of the test bacteria from stock strain to a nutrient agar medium; culturing the bacteria at 37±1° C. for 16 to 24 hours; further transplanting one platinum loop of the cultured bacteria to a new nutrient agar medium; and culturing the bacteria at 37±1° C. for 16 to 20 hours.

A test bacteria liquid is prepared by the steps of: uniformly dispersing one platinum loop of bacterial cells in a precultured test strain into a small amount of 1/500 NB; measuring the number of bacteria by direct observation with a microscope; appropriately diluting the bacteria liquid with 1/500 NB so that the diluted solution contains the bacteria in the number of about $6.7 \times 10^5$ to about $2.6 \times 10^6$/ml; and using the solution as the test bacteria liquid.

The test bacteria liquid is inoculated on each test piece by the steps of: precisely collecting the test bacteria liquid with a pipette; dropping the collected test bacteria liquid onto each test piece; covering the dropped test bacteria liquid with an adhesive film; softly pressing down the adhesive film so that the test bacteria liquid can spread over the whole adhesive film while paying attention to the test bacteria liquid so that any bacteria liquid may not spill out of the edge of the adhesion film; and then putting moisture retention glass on the film.

The inoculated test bacteria liquid is washed out by the steps of: putting the adhesion film and the test piece into a sterilized stomacher sack with a pair of sterilized tweezers, while paying attention to the bacteria liquid so that the bacteria liquid may not spill out of the edge of the adhesion film; adding 10 ml of an SCDLP culture medium into the suck with a pipette; and sufficiently rubbing the test piece and the coating film by the hand to wash out the test bacteria. The washed out liquid is immediately subjected to the measurement of the number of bacteria as described bellow.

The number of bacteria is measured with a poured plate culture method according to a 10-fold dilution method. Collect 1 ml of a washed out liquid with a sterilized pipette, pour the collected liquid into a test tube which has accommodated 9±0.1 ml of a physiological saline solution, and sufficiently stir the mixed solution. Furthermore, collect 1 ml of the mixed solution from the test tube with a new pipette, pour the collected solution to another test tube which has accommodated 9±0.1 ml of a physiological saline solution, and sufficiently stir the mixed solution. Sequentially repeat the operation to prepare diluted series according to the 10-fold dilution method, collect 1 ml of respectively diluted solution from the test tube containing the dilution series with a new pipette, transfer the respective solutions to each of two different dishes, put 15 to 20 ml of a nutrient agar medium kept at 45 to 48° C. into each of the dishes, cover the dishes with a lid, and leave the dishes at room temperature for 15 minutes. After the culture medium has been solidified, invert the dish, and culture the bacteria at 37±1° C. for 40 to 48 hours. After culture, measure the number of colonies in the dishes of the diluted series in which 30 to 300 colonies have appeared, and determine a bacteria concentration of the washed out liquid to two significant figures by the expression (Equation 1).

$$P = Z \times R \quad \text{[Equation 1]}$$

P: bacteria concentration (pieces per milliliter)
Z: average value (piece) of number of colonies in two dishes
R: dilution rate When the number of colonies is less than one, the bacteria concentration is calculated based on the average value of "1".

The number of living bacteria can be determined from a bacteria concentration which has been given by the expression (Equation 1), by using the expression (Equation 2).

$$N = P \times V \quad \text{[Equation 2]}$$

N: number of living bacteria (piece)
P: bacteria concentration determined by the expression (Equation 1)
V: liquid volume (ml) of SCDLP culture medium used for washing out bacteria When the number of colonies is "<1", the number of living bacteria is expressed as "<10" (when V is 10 ml), and the assumed average value of "10" is used for calculation. In addition, when the number of colonies is less than 30, the number of living bacteria is calculated with the use of the measured number of colonies.

Values of antibacterial activity $R_L$ and $R_D$, and an effect $\Delta R$ due to irradiation with light can be calculated by using the following expression (Equation 3), expression (Equation 4) and expression (Equation 5), on the basis of the number of the living bacteria determined by the expression (Equation 2).

$$R_L = [\log(B_L/A) - \log(C_L/A)] = \log [B_L/C_L] \quad \text{[Equation 3]}$$

L: ultraviolet radiation illuminance (mW/cm$^2$) used in test
$R_L$: value of antibacterial activity of photocatalyst-antibacterial processed product in ultraviolet irradiation condition L
A: average value (piece) of the number of living bacteria on test piece which is not photocatalyst-antibacterial processed, and right after having been inoculated
$B_L$: average value (piece) of the number of living bacteria on test piece which is not photocatalyst-antibacterial processed and after having been irradiated with light in ultraviolet radiation illuminance condition (L) for predetermined period of time
$C_L$: average value (piece) of the number of living bacteria on test piece which has been photocatalyst antibacterial processed and after having been irradiated with light in ultraviolet radiation illuminance condition (L) for predetermined period of time $$R_D = [\log(B_D/A) - \log(C_D/A)] = \log [B_D/CD] \quad \text{[Equation 4]}$$

$R_D$: value of antibacterial activity of photocatalyst-antibacterial processed product in ultraviolet irradiation condition (L)
A: average value (piece) of the number of living bacteria on test piece which is not photocatalyst-antibacterial processed, and right after having been inoculated
$B_D$: average value (piece) of the number of living bacteria on test piece which is not photocatalyst-antibacterial processed and after having been reserved in dark place for predetermined period of time
$C_D$: average value (piece) of the number of living bacteria on test piece which has been photocatalyst-antibacterial processed and after having been reserved in dark place for predetermined period of time $$\Delta R = \log [C_D/C_L] \quad \text{[Equation 5]}$$

$\Delta R$: effect of photocatalyst-antibacterial processed product when irradiated with light Example 1

A titanium gel was prepared by adding ammonia water (NH$_3$=3.0%) to an aqueous solution of titanium tetrachloride (TiO$_2$=0.5%) while stirring the solution. A slurry of a titanium gel containing 6.2% of $TiO_2$ was obtained by filtering the prepared titanium gel, and washing the gel with water until chlorine ions in a filtrate became 100 ppm or less with respect to the titanium gel ($TiO_2$). $Ag_2O$ and $CuO$ in the total amount of 5 mass % with respect to titanium oxides ($TiO_2$) were added to 200 g of the slurry. Specifically, 0.1 g of Silver oxide ($Ag_2O$ made by Wako Pure Chemical Industries, Ltd.) and 0.6 g of copper hydroxide ($Cu(OH)_2$ made by Kanto Chemical Co. Inc.) so that a ratio of copper to silver can satisfy the relation of $CuO/Ag_2O$ (mass ratio)=5. A sol according to the present invention ($TiO_2$=6.10%, $Ag_2O$=0.05%, $CuO$=0.24%, and tetramethyl ammonium hydroxide=0.2%) was obtained by the steps of: further adding 1.7 g of an aqueous 25% solution of tetramethyl ammonium hydroxide (made by Tama Chemicals Co., Ltd.) which shall be 0.03 mol with respect to 1 mol of titanium oxides ($TiO_2$); sufficiently stirring thus mixed fluid; and putting the fluid into an autoclave to hydrothermally treat the fluid at 130° C. for 10 hours. As a result of having dried the sol at 100° C. and analyzed the obtained powder with powder X-ray diffractometry, a peak of anatase-type titanium oxide was recognized. In addition, as a result of having determined a value of a lightness index ΔL for the purpose of evaluating a degree of discoloration of the obtained sol according to the present invention, the value was 1.29.

Comparative Example 1

The test was carried out in the same conditions as in Example 1, except that 0.6 g of copper hydroxide was not added, and a value of a lightness index ΔL of the obtained sol was determined The value was 12.33.

Example 2

A titanium gel was prepared by adding ammonia water ($NH_3$=3.0%) to an aqueous solution of titanium sulfate ($TiO_2$=0.5%) while stirring the solution. A slurry of a titanium gel containing 6.2% of $TiO_2$ was obtained by filtering the prepared titanium gel, and washing the gel with water until sulfate ions in a filtrate became 100 ppm or less with respect to the titanium gel ($TiO_2$). A sol according to the present invention ($TiO_2$=6.1%, $Ag_2O$=0.05%, $CuO$=0.24%, and tetramethyl ammonium hydroxide=0.2%) was obtained by the steps of: adding $Ag_2O$ and $CuO$ in the total amount of 5 mass % with respect to titanium oxides ($TiO_2$), specifically 0.1 g of silver oxide and 0.6 g of copper hydroxide so that a ratio of copper to silver can satisfy the relation of $CuO/Ag_2O$ (mass ratio)=5, and 1.7 g of an aqueous 25% solution of tetramethyl ammonium hydroxide, to 200 g of the slurry; sufficiently stirring thus mixed fluid; and putting the fluid into an autoclave to hydrothermally treat the fluid at 130° C. for 10 hours. As a result of having dried the sol at 100° C. and analyzed the obtained powder with powder X-ray diffractometry, a peak of anatase-type titanium oxide was recognized. Furthermore, as a result of having determined a value of a lightness index ΔL for the purpose of evaluating a degree of discoloration of the obtained sol according to the present invention, the value was 2.24.

Example 3

A titanium gel was prepared by adding ammonia water ($NH_3$=3.0%) to an aqueous solution of titanium tetrachloride ($TiO_2$=0.5%) while stirring the solution. The gel was filtered and washed with water until chlorine ions in a filtrate became 100 ppm or less with respect to the titanium gel ($TiO_2$). A titanium sol containing 6.2% of $TiO_2$ was obtained by putting the gel into an autoclave and hydrothermally treating the gel at 120° C. for 24 hours. A sol according to the present invention was obtained by adding silver oxide and copper hydroxide in ratios shown in Table 1, and 1.7 g of an aqueous 25% solution of tetramethyl ammonium hydroxide to 200 g of the sol obtained in the previous step, and sufficiently stirring the mixed fluid. As a result of having dried the sol at 100° C. and analyzed the obtained powder with powder X-ray diffractometry, a peak of anatase-type titanium oxide was recognized. Furthermore, a value of a lightness index ΔL was determined for the purpose of evaluating a degree of discoloration of obtained sols according to the present invention.

Each sol according to the present invention was left at room temperature for one month and the appearance was observed. As a result, all the sols were stable without causing precipitation.

TABLE 1

| $Ag_2O$ (%) | $CuO$ (%) | $CuO/Ag_2O$ (mass ratio) | Value of lightness index ΔL |
|---|---|---|---|
| 2.00 | 1.00 | 0.5 | 22.23 |
| 1.00 | 2.00 | 2 | 8.55 |
| 0.5 | 2.50 | 5 | 0.43 |
| 0.34 | 2.66 | 8 | 0.06 |
| 4.66 | 2.34 | 0.5 | 13.27 |
| 2.34 | 4.66 | 2 | 9.12 |
| 1.16 | 5.84 | 5 | 1.69 |
| 0.77 | 6.23 | 8 | 0.27 |

Note:
in the Table, $Ag_2O$ (%) and $CuO$ (%) represent ratios with respect to $TiO_2$.

Comparative Example 2

A titanium gel was prepared by adding ammonia water ($NH_3$=3.0%) to an aqueous solution of titanium tetrachloride ($TiO_2$=0.5%) while stirring the solution. A slurry of a titanium gel containing 6.2% $TiO_2$ was obtained by filtering the prepared titanium gel, and washing the gel with water until chlorine ions in a filtrate became 100 ppm or less with respect to the titanium gel ($TiO_2$). Into the 200 g of the slurry, 0.1 g of silver oxide and 0.6 g of copper hydroxide were added, and the mixed slurry was sufficiently stirred. Then, the slurry was put into an autoclave, and hydrothermally treated at 130° C. for 10 hours. As a result, the slurry was gelated and a sol was not obtained.

Comparative Example 3

A titanium gel was prepared by adding ammonia water ($NH_3$=3.0%) to an aqueous solution of titanium tetrachloride ($TiO_2$=0.5%) while stirring the solution. A slurry of a titanium gel containing 6.2% $TiO_2$ was obtained by filtering the prepared titanium gel, and washing the gel with water until chlorine ions in a filtrate became 100 ppm or less with respect to the titanium gel ($TiO_2$). Into the 200 g of the slurry, 0.1 g of silver oxide, 0.6 g of copper hydroxide and 0.3 g of monoethanolamine were added, and the mixed slurry was sufficiently stirred. Then, the slurry was put into an autoclave, and hydrothermally treated at 130° C. for 10 hours. As a result, a sol was obtained. As a result of having dried the sol at 100° C. and analyzed the obtained powder with powder X-ray diffractometry, a peak of anatase-type titanium oxide was recognized. Furthermore, as a result of having determined a value of a lightness index ΔL for the purpose of evaluating a degree of discoloration of the obtained sol according to the present invention, the value was 4.82.

However, the obtained sol caused the increase of its viscosity after 7 days of reservation at room temperature, and was gelated.

Example 4

Alkali silicate and water were added to a photocatalyst titanium oxide sol obtained in Example 1, and the mixture was stirred. Thus, a photocatalytic coating composition was obtained. The photocatalytic coating composition had the following chemical composition:

| | |
|---|---|
| Photocatalytic titanium oxide (containing $Ag_2O$ and CuO) | 13 to 30% |
| $SiO_2$ | 45 to 70% |
| $Na_2O$ | 0 to 20% |
| $Li_2O$ | 0 to 20% |
| $K_2O$ | 0 to 20%. |

A Ratio of $TiO_2$ to $SiO_2$ in the coating composition was controlled into 1 to 3, and the concentration of a solid content in the coating composition was controlled into 0.5%. The coating composition was sprayed onto a glazed tile, was dried by heating the tile at 800° C. for one minute and was cut into a test piece with a size of 50 mm per side. Then, the test piece was subjected to an antibacterial activity test. As a result of having conducted the antibacterial activity test on conditions shown in Table 2, values $R_L$ and $R_D$ of antibacterial activity showed 4.3 and 2.5 respectively.

Example 5

A photocatalytic coating composition was obtained by the steps of: adding acrylic resin emulsion, pigment of titanium oxide, talc, fibrous pigment, colloidal silica and water to a photocatalytic titanium oxide sol obtained in Example 1; and stirring the mixture. The photocatalytic coating composition had the following chemical composition:

| | |
|---|---|
| Photocatalytic titanium oxide (containing $Ag_2O$ and CuO) | 0.05 to 5% |
| Acrylic resin | 30 to 50% |
| Pigment (white) | 30 to 40% |
| Talc | 5 to 10% |
| Fibrous pigment | 5 to 10% |
| $SiO_2$ | 5 to 20%. |

A ratio of $TiO_2$ to the acryl resin in the coating composition was controlled into 1 to 200, and the concentration of a solid content in the coating composition was controlled into 50%. The coating composition was applied onto an aluminum substrate with a roller, was dried at room temperature for seven days, and was cut into a test piece with a size of 50 mm per side. Then, the test piece was subjected to an antibacterial activity test. As a result of having conducted the antibacterial activity test on conditions shown in Table 2, values $R_L$ and $R_D$ of antibacterial activity showed 4.0 and 4.1 respectively.

TABLE 2

| | Example 4 | Example 5 |
|---|---|---|
| Substrate | Glazed tile | Aluminum sheet |
| Type of light source | Black-light fluorescent lamp (BLB 351 nm) | |
| Ultraviolet ray illuminance meter | UV intensity meter | |
| Type of adhesive film | 35 × 35 mm² | 40 × 40 mm² |
| Light irradiation condition | 0.1 mW/cm² for 4 hrs | 0.25 mW/cm² for 2 hrs |
| Type of fungi used in test | *Escherichia coli*; NBRC3972 | |
| Suspension | 1/500 NB | |
| Dilute solution | SCDLP | BS |
| Collected liquid | SCDLP 10 ml | |
| Reservation temperature | 25 ± 1° C. | |
| Collection method | Washing out | |
| Inoculum dose | 0.12 ml | 0.1 ml |
| The number of living bacteria in test bacteria liquid | $1.5 \times 10^6$ pieces/ml | $1.8 \times 10^6$ pieces/ml |
| A | $1.8 \times 10^5$ pieces | $1.8 \times 10^5$ pieces |
| $B_L$ | $2.1 \times 10^5$ pieces | $2.0 \times 10^5$ pieces |
| $C_L$ | <10 pieces | 13 pieces |
| $R_L$ | 4.3 | 4.0 |
| $B_D$ | $2.4 \times 10^5$ pieces | $2.4 \times 10^5$ pieces |
| $C_D$ | $7.1 \times 10^2$ pieces | <10 pieces |
| $R_D$ | 2.5 | 4.1 |

The invention claimed is:

1. A photocatalytic coating composition comprising photocatalytic titanium oxide, silver, copper and a quaternary ammonium hydroxide as a stabilizer.

2. The photocatalytic coating composition according to claim 1, having a lightness index ΔL in the value of 10 or less, when irradiated with a light having a wavelength range of 300 to 400 nm.

3. The photocatalytic coating composition according to claim 1, wherein the content of silver is 0.1 to 5 mass % with respect to titanium oxide in terms of $Ag_2O/TiO_2$, and the ratio of copper is 1 to 30 with respect to silver in terms of $CuO/Ag_2O$ (mass ratio).

4. The photocatalytic coating composition according to claim 1, wherein the quaternary ammonium hydroxide is tetramethyl ammonium hydroxide.

5. The photocatalytic coating composition according to claim 1, wherein the content of the quaternary ammonium hydroxide is 0.01 to 0.1 mol with respect to 1 mol of titanium oxides ($TiO_2$).

6. The photocatalytic coating composition according to claim 1, wherein the photocatalytic titanium oxide is an anatase type or a rutile type crystal of titanium oxide.

7. A photocatalytic member obtained by coating a substrate with a photocatalytic coating composition which comprises photocatalytic titanium oxide, silver, copper and a quaternary ammonium hydroxide as a stabilizer.

8. The photocatalytic member according to claim 7, wherein the photocatalytic coating composition has a lightness index ΔL in the value of 10 or less, when irradiated with a light having a wavelength range of 300 to 400 nm.

9. The photocatalytic member according to claim 7, wherein the content of silver in the photocatalytic coating composition is 0.1 to 5 mass % with respect to titanium oxide in terms of $Ag_2O/TiO_2$, and the ratio of copper is 1 to 30 with respect to silver in terms of $CuO/Ag_2O$ (mass ratio).

10. The photocatalytic member according to claim 7, wherein the quaternary ammonium hydroxide in the photocatalytic coating composition is tetramethyl ammonium hydroxide.

11. The photocatalytic member according to claim 7, wherein the content of the quaternary ammonium hydroxide in the photocatalytic coating composition is 0.01 to 0.1 mol with respect to 1 mol of titanium oxides ($TiO_2$).

12. The photocatalytic member according to claim 7, which is an interior material.

13. A photocatalytic member obtained by coating a substrate with a photocatalytic coating composition which comprises photocatalytic titanium oxide, silver, copper and a quaternary ammonium hydroxide as a stabilizer and heating to dry the substrate.

14. The photocatalytic member according to claim 13, wherein the photocatalytic coating composition has a lightness index ΔL in the value of 10 or less, when irradiated with a light having a wavelength range of 300 to 400 nm.

15. The photocatalytic member according to claim 13, wherein the content of silver in the photocatalytic coating composition is 0.1 to 5 mass % with respect to titanium oxide in terms of $Ag_2O/TiO_2$, and the ratio of copper is 1 to 30 with respect to silver in terms of $CuO/Ag_2O$ (mass ratio).

16. The photocatalytic member according to claim 13, wherein the quaternary ammonium hydroxide in the photocatalytic coating composition is tetramethyl ammonium hydroxide.

17. The photocatalytic member according to claim 13, wherein the content of the quaternary ammonium hydroxide in the photocatalytic coating composition is 0.01 to 0.1 mol with respect to 1 mol of titanium oxides ($TiO_2$).

18. The photocatalytic member according to claim 13, which is an interior material.

* * * * *